United States Patent [19]

Gunning

[11] 4,271,576

[45] Jun. 9, 1981

[54] APPARATUS FOR APPLYING COUPLING TO HOSE

[75] Inventor: David W. Gunning, Libertyville, Ill.

[73] Assignee: Anchor Coupling Co., Inc., Libertyville, Ill.

[21] Appl. No.: 52,460

[22] Filed: Jun. 27, 1979

[51] Int. Cl.$^3$ .............................................. B23P 19/04

[52] U.S. Cl. ........................................ 29/237; 269/272

[58] Field of Search .................. 29/237, 282; 269/272

[56] References Cited

U.S. PATENT DOCUMENTS

| | | | |
|---|---|---|---|
| 468,272 | 2/1892 | Watt | 269/272 |
| 1,025,739 | 5/1912 | Davis | 269/272 |
| 1,094,978 | 4/1914 | Church | 29/237 |
| 1,848,867 | 3/1932 | Callaway | 29/237 |
| 2,294,640 | 9/1942 | Wallace | 29/88.2 |
| 2,549,820 | 4/1951 | Kinzle | 29/256 |
| 2,916,812 | 12/1959 | Milo | 29/237 |
| 3,727,289 | 4/1973 | Bemelmann et al. | 29/237 |
| 3,858,298 | 1/1975 | Whitledge et al. | 29/237 |
| 4,033,022 | 7/1977 | Currie | 29/237 |

*Primary Examiner*—James L. Jones, Jr.

*Attorney, Agent, or Firm*—Ronald A. Sandler; Richard A. Craig

[57] ABSTRACT

Manually-operated field apparatus is disclosed for applying a pressed-on coupling to the end of a hose. A frame carries two threadedly-adjustable sets of interleaved clamping plates for clamping a hose end therebetween in a predetermined orientation. The frame defines a pair of tracks on opposite sides of the hose parallel thereto, on which are respectively slidably mounted two runners of a coupling carriage for supporting the coupling between the runners coaxially with the held hose end. A manually-operated ball-type screw and nut assembly mounted on the frame is engageable with the coupling carriage for moving it along the tracks toward the hose end for pressing the coupling onto the held hose end.

5 Claims, 6 Drawing Figures

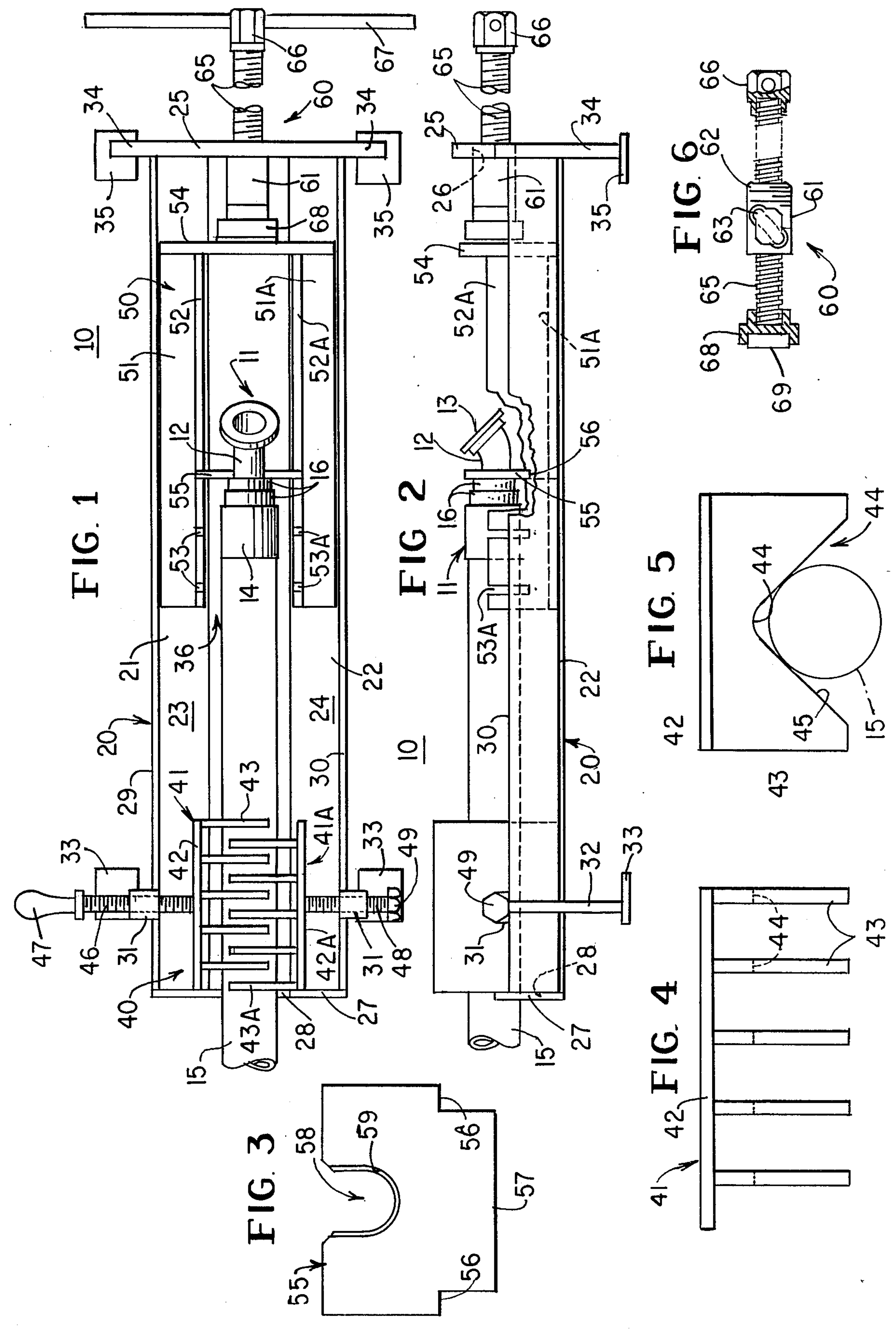

APPARATUS FOR APPLYING COUPLING TO HOSE

BACKGROUND OF THE INVENTION

The present invention relates to apparatus for applying a coupling to an end of a hose. More particularly, the present invention relates to an apparatus which can be manually operated in field applications.

The present invention relates in particular to the application of pressed-on couplings of the type which typically includes coaxial inner and outer sleeves, the outer sleeve having an inner diameter slightly greater than the outer diameter of the associated hose, and the inner sleeve having an outer diameter at least as great as the inner diameter of the hose, so that the coupling must be force- or press-fitted onto the hose and with the hose inner diameter being slightly stretched or spread by the inner sleeve of the coupling. The present invention has to do with apparatus for performing this press-fitting operation, and is particularly useful for larger heavy duty type hose which is relatively rigid, and the operation of applying the coupling to the hose therefore requires substantial force.

Typically, after the coupling has been pressed onto the hose end, the outer sleeve of the coupling then is swaged into firm gripping engagement with the outer surface of the hose by swaging apparatus which forms no part of the present invention, to complete the hose assembly. Typical of the hoses and couplings with which this invention is intended to be used are, for example, the S6 type hose and the S6-SF type flanged coupling manufactured by Anchor Coupling Co., Inc., the assignee of the present invention and a subsidiary of Amerace Corporation.

While apparatus is known for applying pressed-on couplings to hose ends, the prior art apparatus is principally hydraulically-driven, heavy-duty apparatus which is not readily portable and is not suitable for field use.

Hand actuated means have been provided for the swagging of couplings onto hose ends, one such apparatus being illustrated for example, in U.S. Pat. No. 3,858,298, issued on Jan. 7, 1975. But this device is intended to be used only for the swaging operation, and it is necessary that the couplings have been press-fitted onto the hose before insertion into such swaging device. Furthermore, such prior art apparatus could not be utilized for performing the pressing-on operation, since it includes no means for holding the hose end against the axial forces applied thereto by the pressing of the coupling thereonto.

SUMMARY OF THE INVENTION

The present invention relates to an improved apparatus for applying couplings to hose ends, the apparatus being particularly well adapted for field application.

It is a general object of this invention to provide an improved apparatus for applying a coupling to an end of a hose, wherein the apparatus is portable and manually operable.

It is another object of this invention to provide an apparatus of the type set forth which includes means for holding the hose end and manually-operated means for driving the coupling onto the held hose end.

It is another object of this invention to provide an apparatus of the type set forth which includes a carriage which supports the coupling in a predetermined orientation, the carriage being movable for carrying and pressing the coupling onto the hose end, the carriage including means capable of accommodating coupling hose of different dimensions.

These and other objects of the invention are attained by providing apparatus for applying a coupling to an end of a length of hose comprising a frame, clamping means carried by the frame for holding an end of the associated hose in a predetermined position, a coupling carriage slidably mounted on the frame for supporting the associated coupling coaxially with the held end of the associated hose and movable axially thereof, and drive mechanism carried by the frame and associated with the coupling carriage for effecting movement thereof axially toward the held hose end for pressing the coupling onto the held hose end.

Further features of the invention pertain to the particular arrangement of the parts of the coupling-applying apparatus whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 1 is a top plan view of a coupling-applying apparatus constructed in accordance with and embodying the features of the present invention;

FIG. 2 is a front elevational view of the apparatus of FIG. 1, with portions thereof broken away more clearly to illustrate the construction of the apparatus;

FIG. 3 is an end elevational view of the coupling support plate of the present invention;

FIG. 4 is a top plan view of one of the hose clamping members of the present invention;

FIG. 5 is an end elevational view of the hose clamping member of FIG. 4, as viewed from the right-hand end thereof; and FIG. 6 is an isolated view, in partial vertical section, of the drive screw and nut of the present invention.

DESCRIPTION OF THE PREFERRED EMBODIMENT

Referring now to FIGS. 1 and 2 of the drawings, there is illustrated a pusher assembly, generally designated by the numeral 10, for applying a flanged coupling 11 to an end of a hose 15. The coupling 11 is a pressed-on coupling of the type, for example, manufactured by Anchor Coupling Co., Inc. under the designation S6-SF, and includes a central neck 12 which has an inner diameter slightly less than the inner diameter of the associated hose 15 and may either be straight or curved at 45° or 90° angle, a 45° angle coupling being illustrated in the drawings. Fixedly secured to the neck 12 at one end thereof is an attachment flange 13 and fixedly secured thereto at the other end thereof is an elongated outer sleeve 14 provided at the inner end thereof with a plurality of reduced diameter shoulders 16. The outer sleeve 14 has an inner diameter slightly greater than the outer diameter of the hose 15 and is adapted to be received telescopically thereover. Typically, there is provided within the outer sleeve 14 coaxially therewith an inner cylindrical sleeve (not shown) having an outer diameter equal to or slightly greater than the inner diameter of the hose 15 and adapted to be telescopically received thereinto in press-fitted relationship so as to stretch or expand the inner diameter of the hose 15 and provide a tight fit therewith, as is well known in the art.

The pusher assembly 10 includes a frame, generally designated by the numeral 20, which comprises a pair of elongated, laterally spaced-apart parallel bedplates 21 and 22, respectively provided with upper track surfaces 23 and 24 which are substantially coplanar in use. Interconnecting the bedplates 21 and 22 at one end thereof is a first generally rectangular end plate 25 provided with an internally threaded hole 26 (FIG. 2) formed therethrough centrally thereof. Interconnecting the bedplates 21 and 22 at the other ends thereof is a second generally rectangular end plate 27 provided with a rectangular notch 28 formed centrally of the upper edge thereof. Respectively fixedly secured to the bedplates 21 and 22 at the outer edges thereof and extending upwardly therefrom substantially normal thereto are two rectangular retaining flanges 29 and 30, which respectively extend the lengths of the bedplates 21 and 22 and are secured at the opposite ends thereof the end plates 25 and 27.

Respectively fixedly secured to the retaining flanges 29 and 30 at the upper edges thereof adjacent to the left-hand ends thereof, as viewed in FIG. 1, are two lugs 31, each of which is internally threaded to form a nut for a purpose to be explained more fully below. Respectively integral with the lugs 31 and extending downwardly therefrom substantially normal to the bedplates 21 and 22 are two legs 32, each provided at the lower end thereof with foot 33. Integral with the end plate 25 at the opposite side edges thereof and extending downwardly therefrom substantially parallel to the legs 32 are two legs 34, each provided at the lower end thereof with a foot 35. It can be seen that the bedplates 21 and 22, the end plates 25 and 27 and the retaining flanges 29 and 30 cooperate to define a generally box-like open-top bed provided with an elongated slot 36 in the bottom thereof, between the inner edges of the bedplates 21 and 22. In use, the feet 33 and 35 rest upon the ground or other underlying support surface.

Carried by the frame 20 adjacent to the left-hand end thereof, as viewed in FIG. 1, is a clamping assembly, generally designated by the numeral 40. The clamping assembly 40 includes a pair of clamping members 41 and 41A which are of complementary construction, whereby only the clamping member 41 will be described in detail. Referring also to FIGS. 4 and 5 of the drawings, the clamping member 41 includes a rectangular side plate 42 having fixedly secured thereto and extending therefrom normal thereto at longitudinally spaced-apart points therealong a plurality of parallel, identically-constructed bearing plates 43. Each of the bearing plates 43 is generally rectangular in outline, and is provided at the distal edge thereof opposite the side plate 42 with a generally V-shaped notch or recess 44 defining a bearing surface 45. The notches 44 are all identical and aligned with one another. It is noted that the parts of the clamping member 41A bear the same reference numeral as corresponding parts of the clamping member 41, followed by the suffix A.

In use, the side plates 42 and 42A are respectively disposed on the bedplates 21 and 22, substantially normal thereto, with the bearing plates 43 and 43A extending inwardly toward each other in interleaved or alternating relationship, as is best illustrated in FIG. 1. The associated hose 15 is inserted into the frame 20 over the end plate 27 and resting in the notch 28 thereof, with the hose 15 extending longitudinally of and centered with respect to the slot 36 between the bedplates 21 and 22. The clamping members 41 and 41A are respectively moved inwardly toward the hose 15 from opposite sides thereof, with the hose 15 being received in the recesses 44 and 44A of the bearing plates 43 and 43A, until the bearing surfaces 45 and 45A are brought into engagement with the opposite sides of the hose 15. The hose is adjusted so that the open end thereof on which the coupling 11 is to be mounted extends a predetermined distance inwardly beyond the inner end of the clamping assembly 40. It will be appreciated that because of the shape of the recesses 44 and 44A, the hose 15 will automatically center itself thereof regardless of the hose diameter.

The clamping assembly 40 also includes two screws 46 and 48, respectively threadedly engaged in the lugs 31 and having the inner ends thereof respectively disposed in abutting engagement with the outer surfaces of the side plates 42 and 42A of the clamping members 41 and 41A. The screws 46 and 48 may be provided with handles 47 or heads 49 matable with suitable wrenches or the like, for manually rotating the screws and, thereby, pressing the clamping members 41 and 41A firmly into engagement with the opposite sides of the associated hose 15 to securely clamp it in place in a predetermined orientation centered with respect to the slot 36.

The pusher assembly 10 also includes a coupling carriage, generally designated by the numeral 50, which in turn includes a pair of runners 51 and 51A in the form of flat rectangular plates disposed in coplanar relationship and interconnected at one end thereof by an upstanding rectangular end plate 54. The runners 51 and 51A are respectively provided with upstanding support flanges 52 and 52A along the inner edges thereof, these flanges being respectively provided with longitudinally spaced-apart notches 53 and 53A in the upper edges thereof, the notches 53 being respectively disposed in lateral alignment with the notches 53A. In use, the runners 51 and 51A are laterally spaced apart and respectively disposed for sliding engagement along the track surfaces 23 and 24 of the bedplates 21 and 22, with the end plate 54 disposed toward the right-hand end of the frame 20, as viewed in FIG. 1. The runners 51 and 51A are so dimensioned that neither extends into the slot 36 between the bedplates 21 and 22.

Referring now also to FIG. 3 of the drawings, the coupling carriage 50 also includes a support plate, generally designated by the numeral 55, which extends between the support flanges 52 and 52A. More particularly, the support plate 55 is generally rectangular in shape and is provided at the lower end of each of the opposite side edges thereof with a rectangular notch or recess defining a shoulder 56 and defining therebetween a narrowed neck portion 57. Formed in the upper edge of the support plate 55 centrally thereof is a generally U-shaped seat slot or recess 58, the peripheral edges of which are preferably chamfered as at 59.

In use, the support plate 55 is disposed between the support flanges 52 and 52A substantially normal thereto, with the shoulders 56 respectively seated in the bottoms of a laterally-aligned pair of notches 53 and 53A, and with the neck portion 57 of the support plate 55 extending downwardly between the support flanges 52 and 52A. The seat recess or slot 58 in the support plate 55 preferably has a diameter only slightly greater than the diameter of the neck 12 of the coupling 11, but less than the diameter of the first shoulder 16 of the coupling 11. Thus, the neck 12 of the coupling 11 is snugly received in the notch 58 so that the portions of the support plate 55 around the perimeter of the notch 58 bear against the first shoulder 16 of the coupling 11, as best seen in FIGS. 1 and 2. Accordingly, it will be appreciated that the support plate 55 serves to support the coupling 11 in a predetermined position centered between the support flanges 52 and 52A and substantially coaxially with the held end of the hose 15.

The support plate 55 may be disposed in any desired pair of the notches 53 and 53A, depending upon the location of the held end of the hose 15, and the size of the coupling and its angle (45° v 90°). It is another significant feature of this invention that there is preferably provided with the pusher assembly 10 a plurality of support plates 55, respectively provided with different size seat recesses 58 therein for accommodating different sizes of couplings 11. It will also be appreciated that the retaining flanges 29 and 30 of the frame 20 serve to limit lateral movement of the coupling carriage 50 and maintain it centered with respect to the longitudinal axis of the frame 20 so that a coupling 11 held in the coupling carriage 50 will be maintained in its desired coaxial relationship with the held end of the hose 15.

Referring now to FIG. 6 of the drawings, there is provided a drive assembly, generally designated by the numeral 60, for moving the coupling carriage 50. More particularly, the drive assembly 60 includes a cylindrical internally threaded ball nut 61, which has an externally threaded portion 62 at one end thereof adapted to be threadedly engaged in the hole 26 in the end plate 25 from the inner side thereof. The ball nut 61 includes an external tubular ball passage 63 in well-known manner to permit transfer of the balls from one end to the other of the ball nut 61. Disposed in threaded engagement with the ball nut 61 is a ball screw 65, provided with a cap 66 which preferably is swaged onto the outer end of the screw 65 and has an aperture extending diametrically therethrough for receiving an elongated handlebar 67 for manual rotation of the screw 65. Fixedly secured to the inner end of the screw 65, as by swaging, is a bearing bracket 68 in which is press-fitted a thrust bearing 69.

In use, the thrust bearing 69 bears against the outer surface of the end plate 54 of the coupling carriage 50 and then the screw 65 is moved longitudinally inwardly of the frame 20 by rotation of the handlebar 67 for thereby driving the coupling carriage 50 longitudinally along the track surfaces 23 and 24 and carrying the coupling 11 into pressing engagement with the held end of the hose 15. More particularly, it will be appreciated that as the coupling carriage 50 is driven toward the held end of the hose 15, the support plate 55 thereof bears against the first shoulder of the coupling 11 for driving the coupling 11 onto adjacent end of the hose 15. The mechanical advantage obtained by the ball nut and screw assembly and the elongated handlebar 67 permits the generation of sufficient force to press the coupling 11 onto the held end of the coupling 15 in its assembled configuration, the pusher assembly 10 maintaining the parts in their coaxially aligned relationship during the pressing-on operation.

From the foregoing, it can be seen that there has been provided an improved apparatus for applying a coupling to the end of a hose, this apparatus being relatively portable and easily manually operated for convenience of field applications. Additionally, it will be appreciated that there has been provided an apparatus which is readily adjustable for accommodating a variety of sizes of hoses and complementary couplings.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Apparatus for applying a coupling to an end of a length of hose, the apparatus comprising: a longitudinally extending frame;

two clamping members carried by said frame and adapted for receiving and securing the end of the hose therebetween, each of the clamping members including a plurality of spaced parallel bearing plates, each bearing plate having formed therein a recess which defines a bearing surface adapted to engage a portion of the exterior surface of the hose, the bearing plates of one of the clamping members being disposed in alternating relationship to the bearing plates of the other clamping member, the clamping members being substantially horizontally movable in a direction substantially normal to the axis of the associated hose;

adjusting means coupled to the clamping members for effecting movement thereof toward each other and into engagement with the hose to securely hold the end of the hose in a predetermined position relative to the frame, the adjusting means including two screws, said screws being operatively associated with and adapted to horizontally move each of the clamping members;

guide means on said frame, and defined by two elongated guide tracks, one guide track being disposed on each side of the hose and extending parallel to the axis of the frame;

a coupling carriage including two runners slidably disposed for sliding movement along the guide tracks, the runners having laterally aligned notches therein, the coupling carriage being adapted to support a hose coupling co-axially with the length of hose;

a support member adapted to be received in the notches of the runners and extending between the runners, said support member having a recess formed therein for receiving the coupling carriage;

a drive mechanism associated with the coupling carriage for moving the coupling carriage along the guide tracks toward the clamped hose, the drive mechanism including a ball nut and screw assembly carried by said frame, said screw assembly including thrust bearing means adapted for non-rotational engagement of the coupling carriage when the screw is rotated, whereby the screw may be selectively rotated to move the coupling carriage axially relative to the frame for pressing the coupling onto the end of the hose.

2. The apparatus of claim 1, wherein each of said clamping members includes an end plate engageable with said adjusting means and extending in use substantially parallel to the axis of the associated hose.

3. The apparatus of claim 1, wherein said two guide tracks are substantially coplanar.

4. The apparatus of claim 1, wherein said support plate is selectively mountable in any laterally-aligned pair of notches.

5. The apparatus of claim 1, and further including handle means connected to said screw for manual rotation thereof.

* * * * *